United States Patent [19]
Green et al.

[11] Patent Number: 5,550,697
[45] Date of Patent: Aug. 27, 1996

[54] SYSTEM AND METHOD FOR CONTROLLING DC TO AC VOLTAGE INVERTER

[75] Inventors: John D. Green, Granville, Ohio; Ira J. Pitel, Morristown, N.J.

[73] Assignee: Holophane Corporation, Newark, Ohio

[21] Appl. No.: 210,612

[22] Filed: Mar. 18, 1994

[51] Int. Cl.⁶ .................................................. H02H 7/122
[52] U.S. Cl. ................... 361/18; 363/41; 363/56; 363/98
[58] Field of Search ....................... 363/41, 95, 97, 363/98, 55, 56; 361/88, 18

[56] References Cited

U.S. PATENT DOCUMENTS 5,400,237  3/1995  Flanagan et al. .................... 363/41

Primary Examiner—Jeffrey A. Gaffin
Assistant Examiner—Michael J. Sherry
Attorney, Agent, or Firm—Brooks & Kushman P.C.

[57] ABSTRACT

A system and method for controlling a DC to AC voltage inverter. The system and method include an inverter for generating a pulse width modulated (PWM) waveform to convert a DC input voltage to an AC output voltage suitable for use with a non-linear electrical load, and a signal generator for generating a AC output voltage signal representing the AC output voltage. The system and method further include a processor for processing the AC output voltage signal to select the PWM waveform, and a control signal generator for generating a control signal based on the PWM waveform selected operative to control the inverter for generating a PWM waveform.

18 Claims, 11 Drawing Sheets

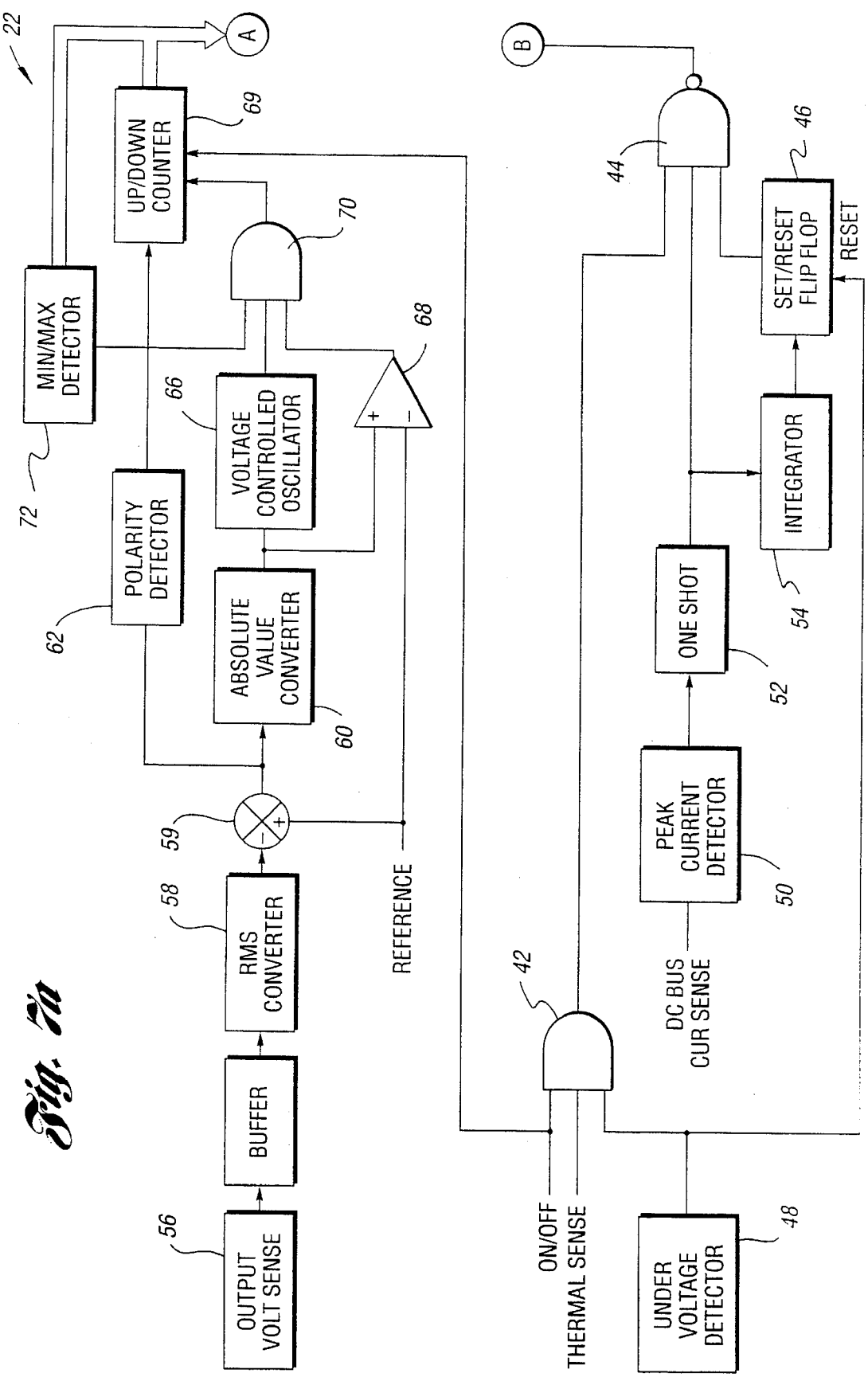

SYSTEM AND METHOD FOR CONTROLLING DC TO AC VOLTAGE INVERTER

TECHNICAL FIELD

This invention relates to a system and method for controlling a DC to AC voltage inverter.

BACKGROUND ART

Computer equipment and energy efficient lighting are becoming increasingly important types of electrical loads for many different facilities including schools, hospitals, water treatment plants, prisons, commercial establishments and industrial plants. As a result, computer equipment and energy efficient lighting are also becoming an increasingly greater burden on utility power systems. Moreover, many of these facilities are required to provide emergency backup systems to maintain operation of important computer equipment and energy efficient lighting loads, as well as various other electrical loads, during utility power failures such as outages (blackouts) or low voltage situations (brownouts).

Many computer equipment and energy efficient lighting loads, such as electronic compact fluorescent lamps, interface with the utility power through rudimentary power inverters consisting of full bridge rectifiers and DC bus capacitors. These economical circuits draw current at the peak of the utility AC voltage and produce current harmonics at utility frequencies. Other types of energy efficient lighting, such as compact fluorescent lamps, use series reactors to interface with utility power. Series reactors, however, also produce current harmonics due to the non-linear characteristics of the fluorescent lamps.

To overcome the problem of drawing current without introducing additional harmonics, solid-state ballasts and some computer equipment use higher performance inverters to interface with the utility power. Ideally, these power inverters maintain constant voltage, current, and power to the load regardless of input voltage. To satisfy these conditions, however, input power (less losses) must be held constant thereby requiring input current to increase upon decreasing input voltage. As a result, such inverters have input characteristics equivalent to a dynamic negative resistor.

Various systems and methods are known to provide backup power in the event of utility power failures. Among the most common are internal combustion engine driven generators. Such generators, however, can suffer from space requirement, noise, ventilation and maintenance problems.

To overcome many of the problems associated with backup generators, solid state sinewave inverters are commonly utilized to provide alternate power in the event of utility power failures. This is especially true where computer equipment and energy efficient lighting type loads are commonly found. Solid state inverters operate on the principle of electronically inverting a DC input voltage to produce an AC output voltage. There are many ways of performing this function each of them having unique characteristics.

Square wave inverters use a transformer and two or four semiconductor switches to produce a square wave voltage at the switching frequency. The output voltage is proportional to the input voltage and the turn ratio of the transformer. These inverters are characteristically very low cost and only work with loads not sensitive to voltage waveform.

Ferroresonant inverters consist of a square wave inverter and a ferroresonant transformer. Ferroresonant transformers have a current limiting reactor and an AC capacitor that is tuned to the driving frequency of the inverter. Such a series resonant circuit is designed to saturate the magnetic core, thereby regulating the output voltage. The ferroresonant transformer extracts the fundamental component from the square wave to produce a regulated sinewave. However, because the ferroresonant transformer must filter the fundamental component, its output impedance is relatively high compared to that of alternative systems and methods. Such a high output impedance has an adverse effect and can cause some instability in constant power load devices.

Pulse-Width Modulated (PWM) inverters consist of a modified square wave inverter and a low pass output filter. The power circuit of such an inverter is similar to that described above, but the switching rate is increased to lower the harmonic concentration near the fundamental component. The strategy is to suppress lower order harmonics with pulse width modulation, and to suppress higher order harmonics with the low pass filter. The switching method and rate determine the harmonic free band near the fundamental component, the size of the filter, and system losses.

PWM inverters, however, still suffer from various problems associated with powering non-linear loads, such as computers, solid-state ballasts and compact fluorescent lamps, which either generate current harmonics at the driving frequency, or produce loading characteristics of negative resistance. As a result, there is a need for a system and method for controlling a PWM modulated inverter for use with such non-linear loads and in particular lighting loads, as well as with linear loads generally.

Such a system and method may employ a PWM inverter having a switching pattern optimized for lower order harmonic elimination, an output filter whose response has been tailored to the PWM waveform, and a control algorithm which integrates a digital control inside an analog closed-loop control. Such a system and method for controlling a DC to AC voltage inverter would allow unrestricted operation of both linear and non-linear electrical loads, such as computer equipment and energy efficient lighting, in the event of utility power failure.

DISCLOSURE OF INVENTION

Accordingly, it is the principle object of the present invention to provide an improved system and method for controlling a DC to AC voltage inverter.

Another object of the present invention is to provide a system and method for controlling a DC to AC voltage inverter that produces an AC output voltage suitable for use with both linear and non-linear electrical loads such as computers, solid-state lighting ballasts, and compact fluorescent lamps.

According to the present invention, then, a system and method for controlling a DC to AC voltage inverter are provided. The system of the present invention comprises means for generating one of a plurality of pulse width modulated (PWM) waveforms to convert a DC input voltage to an AC output voltage suitable for use with a non-linear load, and means for generating an AC output voltage signal representing the AC output voltage. The system of the present invention further comprises means for processing the AC output voltage signal to select one of the plurality of PWM waveforms, and means for generating a control signal based on the PWM waveform selected operative to control the means for generating one of the plurality of PWM waveforms.

The method of the present invention for controlling a DC to AC voltage inverter comprises generating one of a plurality of pulse width modulated (PWM) waveforms to convert a DC input voltage to an AC output voltage suitable for use with a non-linear load, and generating an AC output voltage signal representing the AC output voltage. The method of the present invention further comprises processing the AC output voltage signal to select one of the plurality of PWM waveforms, and generating a control signal based on the PWM waveform selected operative to control the generation of one of the plurality of PWM waveforms.

These and other objects, features and advantages will be readily apparent upon consideration of the following detailed description in conjunction with the accompanying drawings.

BRIEF DESCRIPTION OF DRAWINGS

FIGS. 7a–7b are a block diagram of the controller of the system for controlling a DC to AC voltage inverter of the present invention;

BEST MODE FOR CARRYING OUT THE INVENTION

Figure 1:
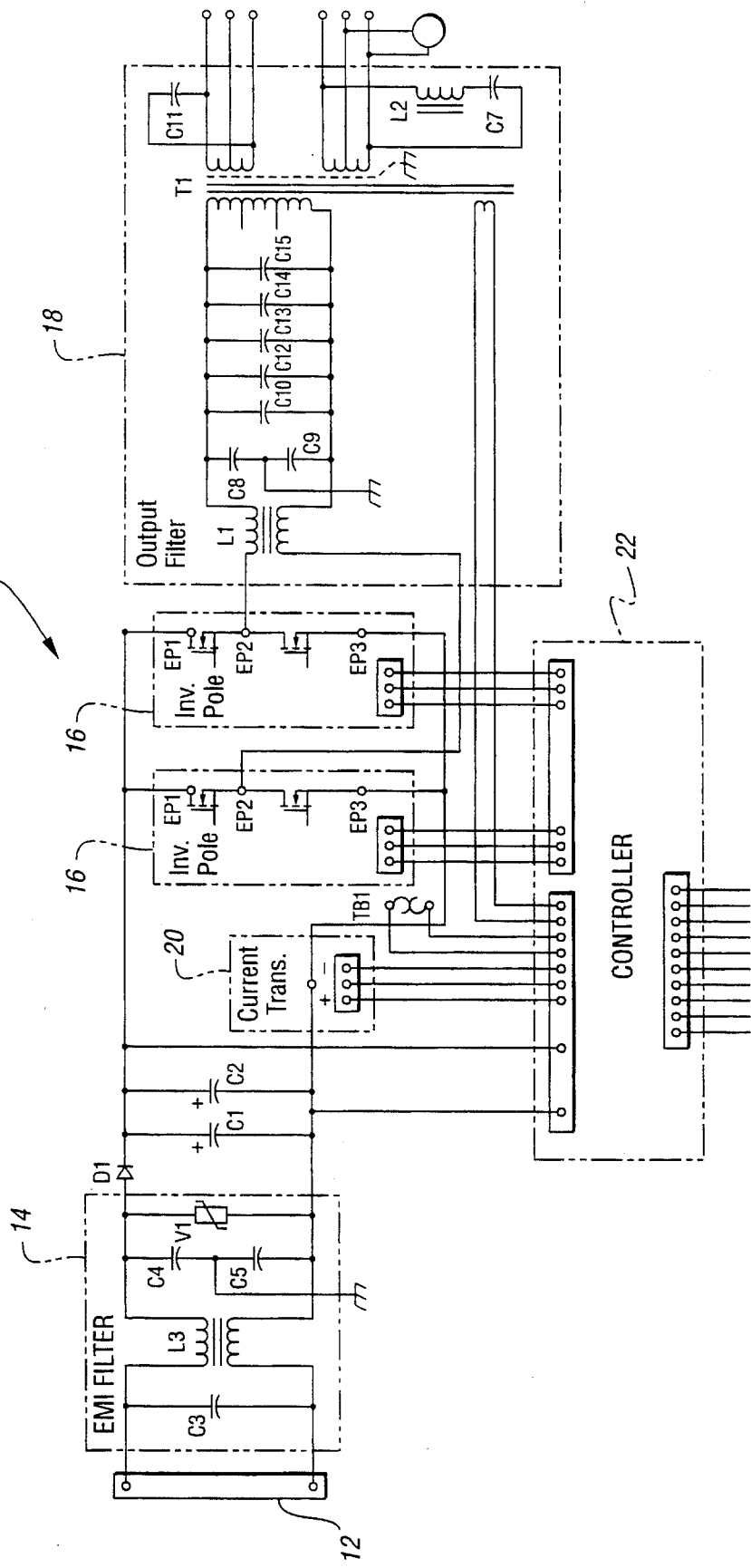
FIG. 1 is a simplified schematic of the system for controlling a DC to AC voltage inverter of the present invention.

Referring first to FIG. 1, a simplified schematic of the system for controlling a DC to AC voltage inverter of the present invention is shown, denoted generally be reference numeral 10. As seen therein, a DC power source (12) is provided in electrical communication with an electromagnetic interference (EMI) filter (14), which is itself provided in electrical communication with a protection diode D1 and input filter capacitors C1 and C2. DC power source (12) preferably provides anywhere from 12 to 96 volts DC in 12 volt DC increments, but may provide any DC voltage.

Protection diode D1 and input filter capacitors C1 and C2 are in turn provided in electrical communication with pair of inverter poles (16), which are themselves provided in electrical communication with an output filter (18). Inverter poles (16) and output filter (18), as will be discussed in greater detail below, are preferably designed to produce a single phase 120 volt sinusoidal AC output, but may be designed to produce any AC output voltage including waveshapes other than sinusoidal.

Input filter capacitors C1 and C2 are also provided in electrical communication with a current transducer (20). Finally, a controller (22) is also provided in electrical communication with input filter capacitors C1 and C2, inverter poles (16), output filter (18), current transducer (20) and thermal protector TB1. Thermal protector TB1 provides a means for generating a thermal overload signal upon thermal overload of the inverter.

EMI filter (14) is arranged to attenuate common mode and differential mode electromagnetic interference. For common mode attenuation, inductor L3 is wound on a high permeability ferrite core and provides high impedance from the positive and negative input leads with respect to ground. Capacitors C4 and C5 provide a low impedance path to ground.

For differential mode attenuation, leakage inductance of inductor L3 provides a high impedance between the system (10) and the DC power source (12). Capacitor C3 provides a low impedance path between the positive and negative inputs. Varistor V1 suppresses transients that can appear on the input bus of the DC power source (12). EMI filter (14) thus provides a means for filtering electromagnetic interference from the DC input voltage of the DC power source (12).

Capacitors C1 and C2 provide a low impedance path for high-frequency currents to flow. Diode D1 protects the system (10) from being damaged when connected with improper input voltage polarity from the DC power source (12).

Figure 2:
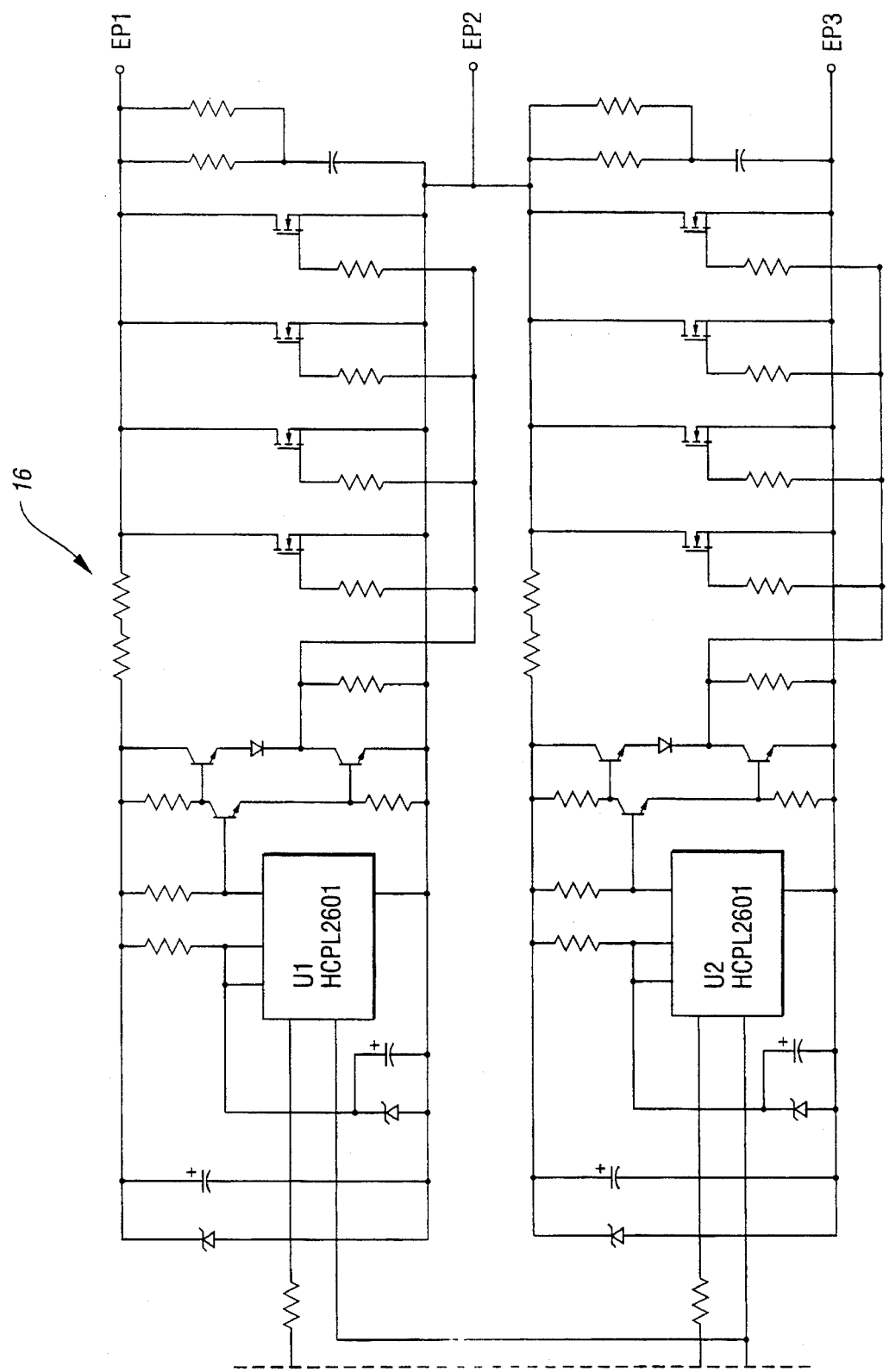
FIG. 2 is a detailed schematic of the inverter transistor totem pole array and associated control circuitry ("inverter poles") of the system for controlling a DC to AC voltage inverter of the present invention.

A detailed schematic of the inverter poles (16) of the system (10) for controlling a DC to AC voltage inverter of the present invention is shown in FIG. 2, denoted generally by reference numeral 16. Referring, then, to FIGS. 1 and 2, inverter poles (16) each preferably comprise a plurality of MOSFET power semiconductors. However, bipolar junction transistors (BJT), insulated gate bipolar transistors (IGBT), or MOS controlled transistors (MCT) are equally applicable. According to a switching pattern described in greater detail below, inverter poles (16) alternate the DC input voltage supplied by the DC power source (12) to produce an AC output voltage.

More specifically, alternate sets of semiconductors from the inverter poles (16) (i.e, top left and bottom right, or bottom left and top right) are driven into conduction by controller (22) to produce a pulse width modulated (PWM) voltage waveform, thereby converting the DC input voltage into an AC output voltage suitable for use particularly with a non-linear electrical load, but suitable for use with a linear electrical load as well. Inverter poles (16) and controller (22), which will be described in greater detail below, together provide a means for generating one of a plurality of pulse width modulated (PWM) waveforms to convert a DC input voltage to an AC output voltage suitable for use with a non-linear load.

Figure 3:
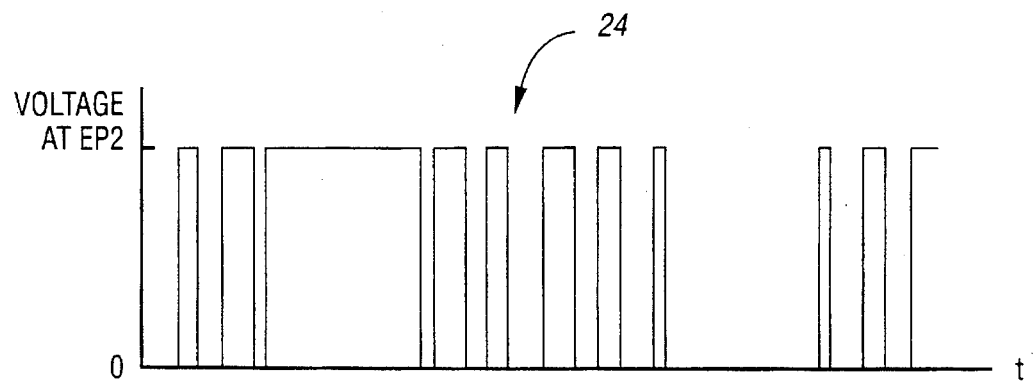
FIG. 3 is a diagram of a typical pulse width modulated (PWM) waveform used in the system and method for controlling a DC to AC voltage inverter of the present invention.

Referring now to FIG. 3, a typical PWM waveform used in the system (10) and method of the present invention to synthesize sinusoidal voltages is shown, denoted generally by reference numeral 24. The PWM waveform (24) is generated at the midpoint of the first inverter pole (16) and the inverse is generated at the second inverter pole (16).

Each switching instant, or commutation, is derived by optimizing a high-order, non-linear equation. Sinusoidal output can be visualized by averaging this PWM waveform (24).

The PWM waveform (24) illustrated in FIG. 3 has been simplified for presentation and is capable of controlling the fundamental component and eliminating the first 11 harmonics. The actual PWM waveforms generated by the system (10) and method of the present invention are optimized to control the fundamental component and eliminate the first 30 harmonics. Application of a number of fundamental components is required to compensate for various input voltages and output currents. Switching patterns, once derived, are placed in an electrically programmable read only memory (EPROM) to produce the best harmonic performance with the least number of commutations.

The number of commutations per cycle affects both losses and performance of the system (10). Increasing the commutations per cycle offers more freedom for harmonics control, but increases system losses. Low power inverters operate in the ultrasonic frequency range and compensate for output waveform on a pulse by pulse basis. While increasing performance, such inverters have the highest costs, and are limited generally to powers less than 1000 Watts. As power is increased, emphasis must be placed, as with the system (10) and method of the present invention, on lowering the number of commutations per cycle and strategically eliminating harmonics.

Figure 4A:
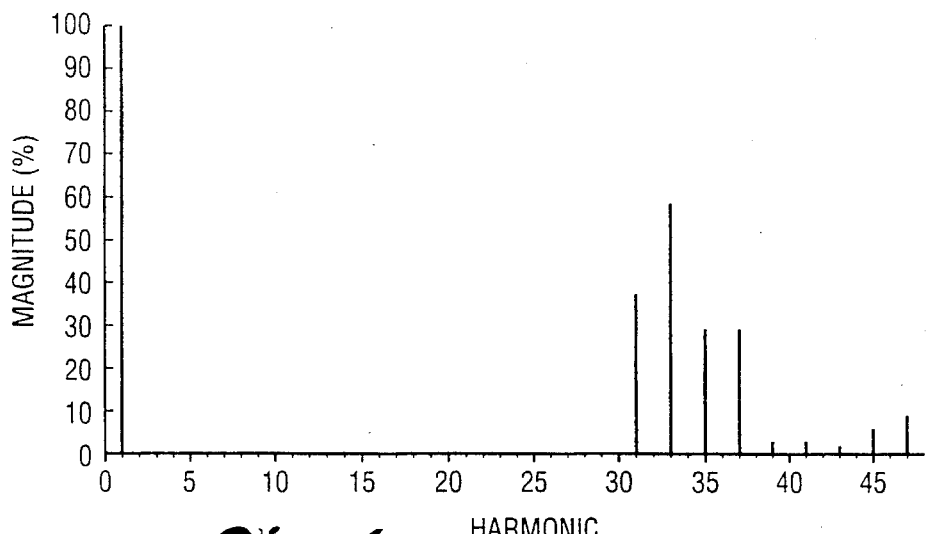
FIGS. 4(a), 4(b) and 4(c) are graphs of the harmonic spectral characteristics of three PWM waveforms used in the system and method for controlling a DC to AC voltage inverter of the present invention.
Figure 4B:
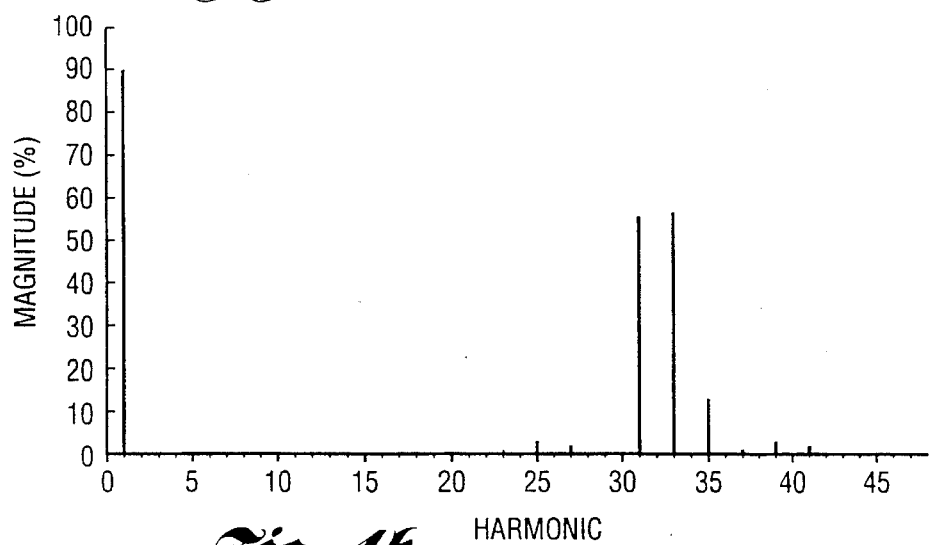
Figure 4C:
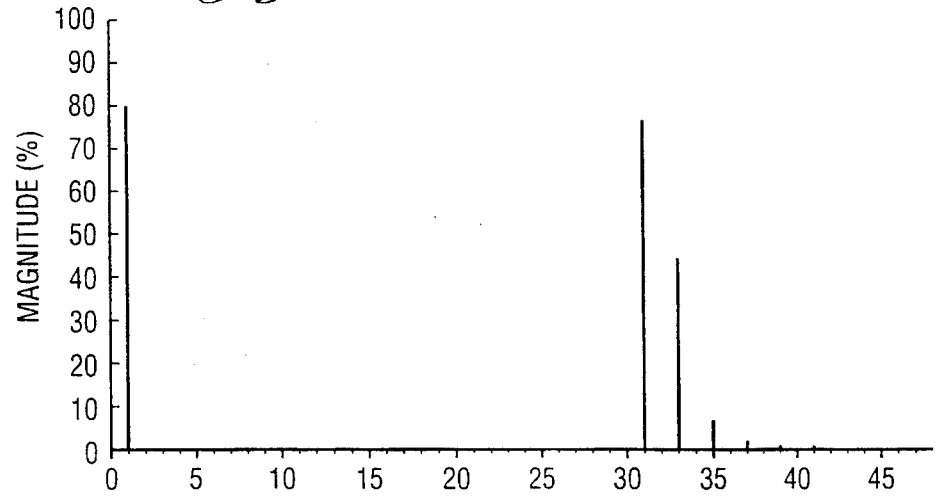

Referring now to FIGS. 4(a), 4(b) and 4(c), graphs of the harmonic spectral characteristics of three PWM waveforms used in the system (10) and method for controlling a DC to AC voltage inverter of the present invention are shown. The waveforms are optimized to produce 100%, 90%, and 80% fundamental components, respectively, as well as to eliminate the first 30 harmonics. As can be observed, there is a strong 31st harmonic component. A dominant harmonic component always appears at the first harmonic past the optimization process.

Referring again to FIG. 1, output filter (18) attenuates the high-frequency portion of the PWM waveform generated by inverter poles (16). As seen therein, output filter (18) comprises a low pass section, inductor L1 and capacitors C10 through C15, and a trap section including inductor L2 and capacitor C7. Capacitors C8 and C9 attenuate common mode EMI on the output. The characteristics of output filter (18) are thus tailored to the PWM waveforms.

Figure 5:
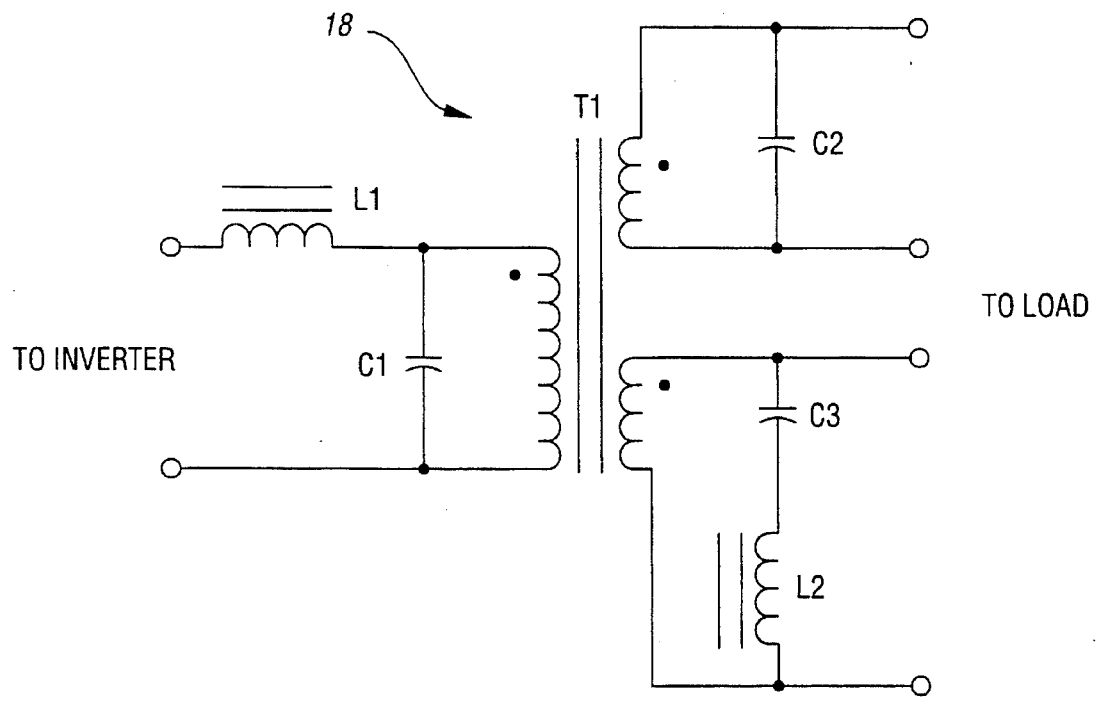
FIG. 5 is a simplified schematic of the output filter of the system for controlling a DC to AC voltage inverter of the present invention.

A simplified schematic of output filter (18) of the system (10) for controlling a DC to AC voltage inverter of the present invention is shown in FIG. 5, denoted generally by reference numeral 18. As seen therein, output filter (18) comprises a low pass section, inductor L1 and capacitor C1, and a trap section including inductor L2 and capacitor C3. As is readily apparent, capacitor C1 represents capacitors C10 through C15 from FIG. 1, and capacitor C3 represents capacitor C7 from FIG. 1.

Referring now to FIGS. 1 and 5, output filter (18) further comprises a transformer T1 integrated therein. Placement of the capacitor bank C10 through C15 (in FIG. 1), or C1 (in FIG. 5), on the primary of transformer T1 suppresses high-frequency currents from circulating within the transformer T1.

However, to obtain the desired capacitance for the low pass output filter (18), it is necessary to place some capacitance on the higher voltage secondary of transformer T1 where the per unit capacitance is considerably higher. AC capacitors are generally rated at 240 volts AC or higher. This also produces a second frequency pole by utilizing the leakage inductance of the transformer T1.

The trap section of output filter (18), comprising inductor L2 and capacitor C7 (in FIG. 1), or C3 (in FIG. 5), is designed to attenuate the dominant current harmonic. Capacitor C7 (in FIG. 1), or C3 (in FIG. 5), also adds to the total capacitance like capacitor C11 (in FIG. 1), or C2 (in FIG. 5).

Figure 6:
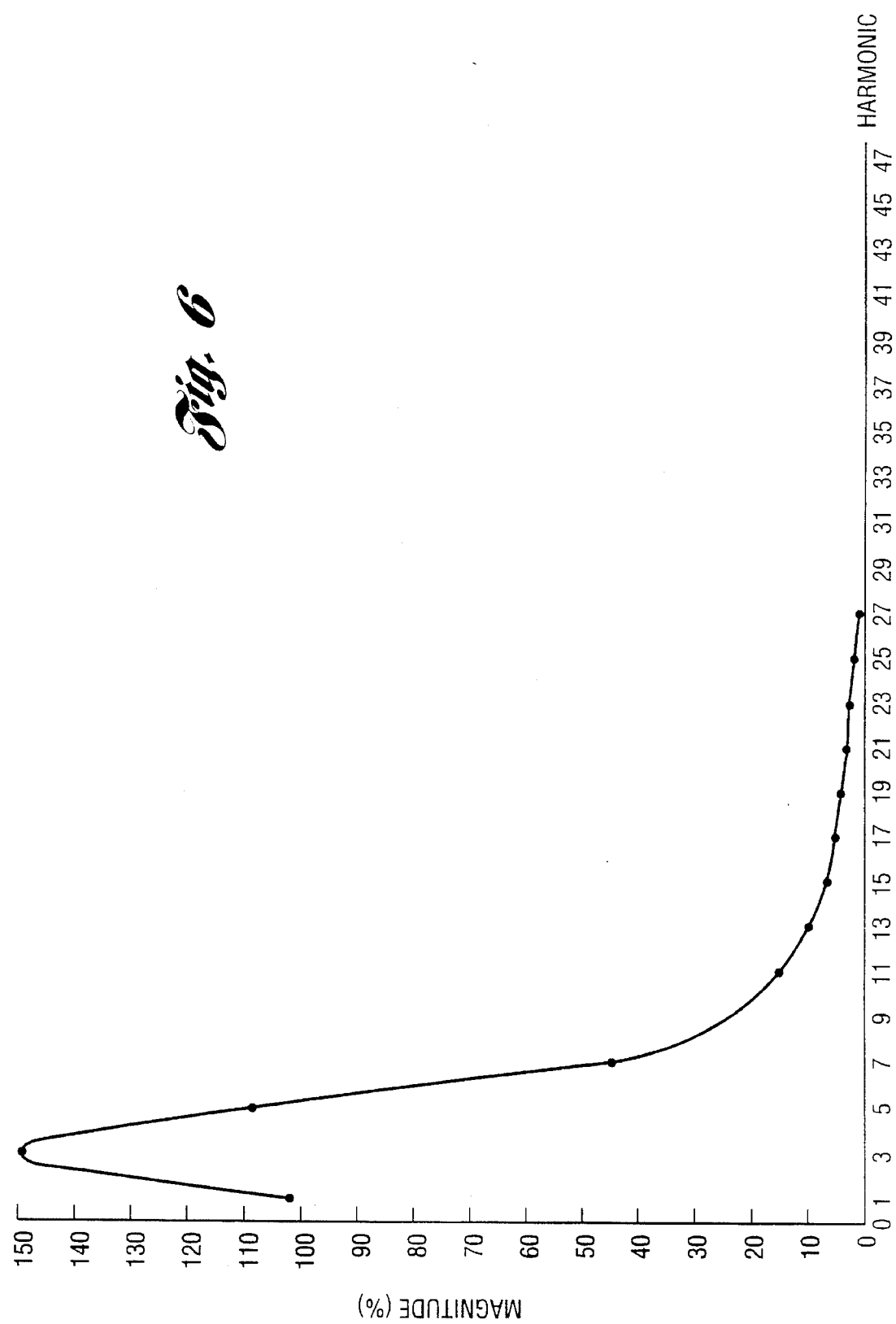
FIG. 6 is a graph of the frequency attenuation characteristics of the output filter of the system for controlling a DC to AC voltage inverter of the present invention.

As seen in FIG. 6, a graph showing the frequency attenuation characteristics of the output filter (18) of the system (10) and method for controlling a DC to AC voltage inverter of the present invention, the low pass output filter (18) is designed to pass harmonics in the band below the trap frequency, in this case the 31st, and to attenuate those harmonics beyond. Output filter (18) thus provides a means for filtering higher order harmonics from the PWM waveform generated.

For use with non-linear electrical loads, the inductor L1 of the output filter (18) must have a lower impedance than would normally be utilized by one of ordinary skill in the art. In that regard, solid-state ballasts have pre-regulators which correct for power factor and regulate lamp current for constant illumination. Such ballasts are constant power devices having negative resistance loading characteristics. Applying such loads across the output of the inverter increases the effective Q of the output filter (18), which can lead to instabilities. Lowering the impedance of inductor L1, however, reduces this sensitivity allowing stable operation. Moreover, a lower output impedance also produces less voltage distortion for non-linear loads such as compact fluorescent lamps and low cost computer power supplies.

The combination of the optimized PWM waveform, as well as the harmonic trap and low inductance L1 of output filter (18) allows the power semiconductors of inverter poles (16) to switch at relatively low frequencies. Such low frequency switching lowers costs and increases efficiency of the system (10) and method of the present invention by producing improved performance with non-linear and negative resistance type loads.

Referring again to FIG. 1, current transducer (20) monitors DC current on the input bus of the DC power source (12). Placement of the current transducer (20) as shown in FIG. 1 allows simultaneous detection of DC overcurrent to the four power semiconductor arrays of the inverter poles (16) and detection of current flowing through the output filter (18). As is readily apparent, current transducer (20) thereby provides a means for generating a DC input current signal representing the DC input current associated with the DC input voltage of the DC power source (12). As noted above, current transducer (20) is electrically connected to the controller (22) which, as will be discussed in greater detail below, is used to control gating of the power semiconductor arrays of the inverter poles (16).

Referring now to FIGS. 7a–7b and 8a–8b, a simplified and a detailed schematic of the controller of the system for controlling a DC to AC voltage inverter of the present invention are shown, respectively, each denoted generally by reference numeral 22. As will be described in greater detail below, controller (22) controls the gating of the four power semiconductor arrays of the inverter poles (16), and selects a PWM waveform for generation in order to produce the desired fundamental component. Controller (22) also monitors DC current from the current transducer (20) and produces shutdown of the inverter if threshold current levels are exceeded. Controller (22) still further provides control for ganged or parallel DC to AC inverters.

Figure 7B:
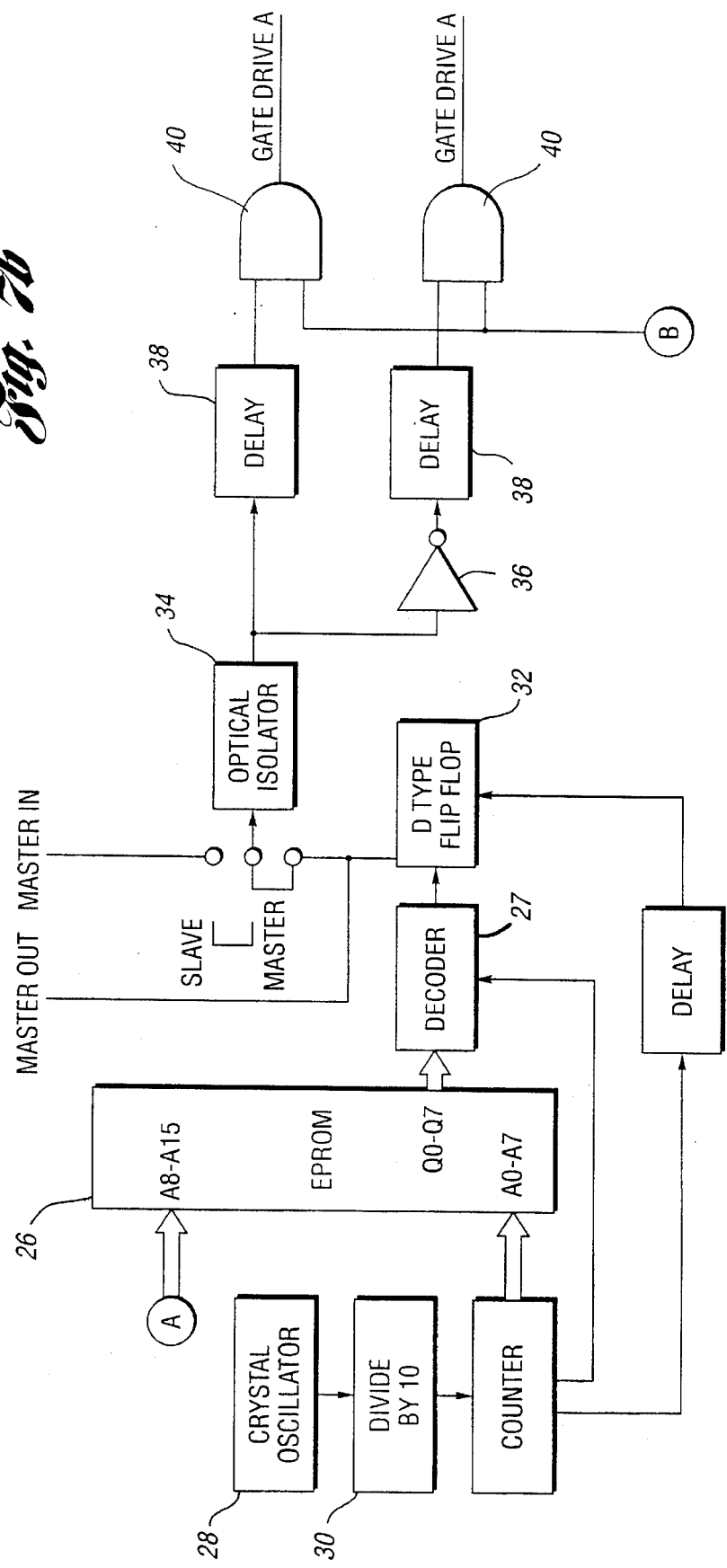
Figure 8A:
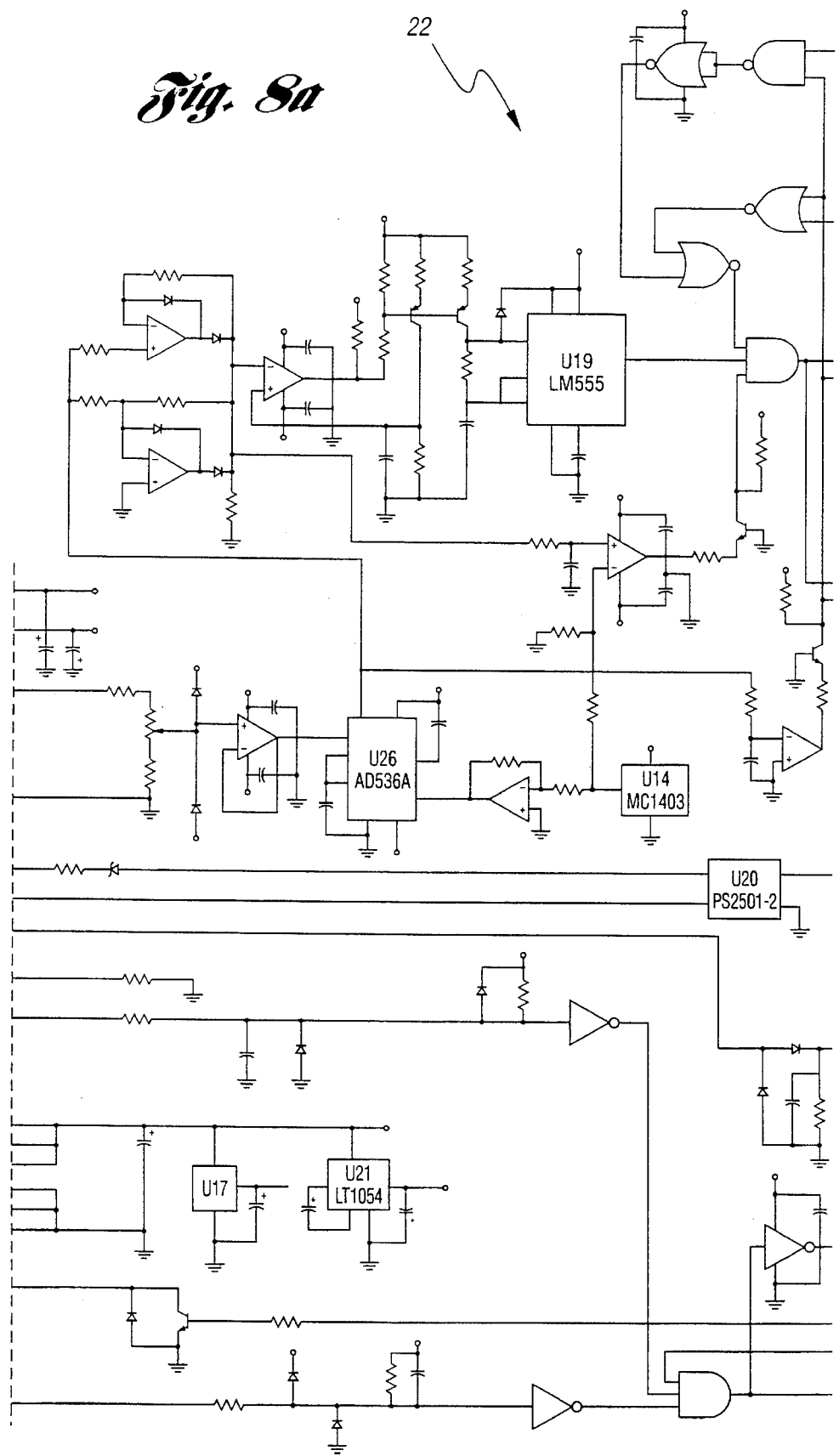
FIGS. 8a–8c is a detailed schematic of the controller of the system for controlling a DC to AC voltage inverter of the present invention.
Figure 8B:
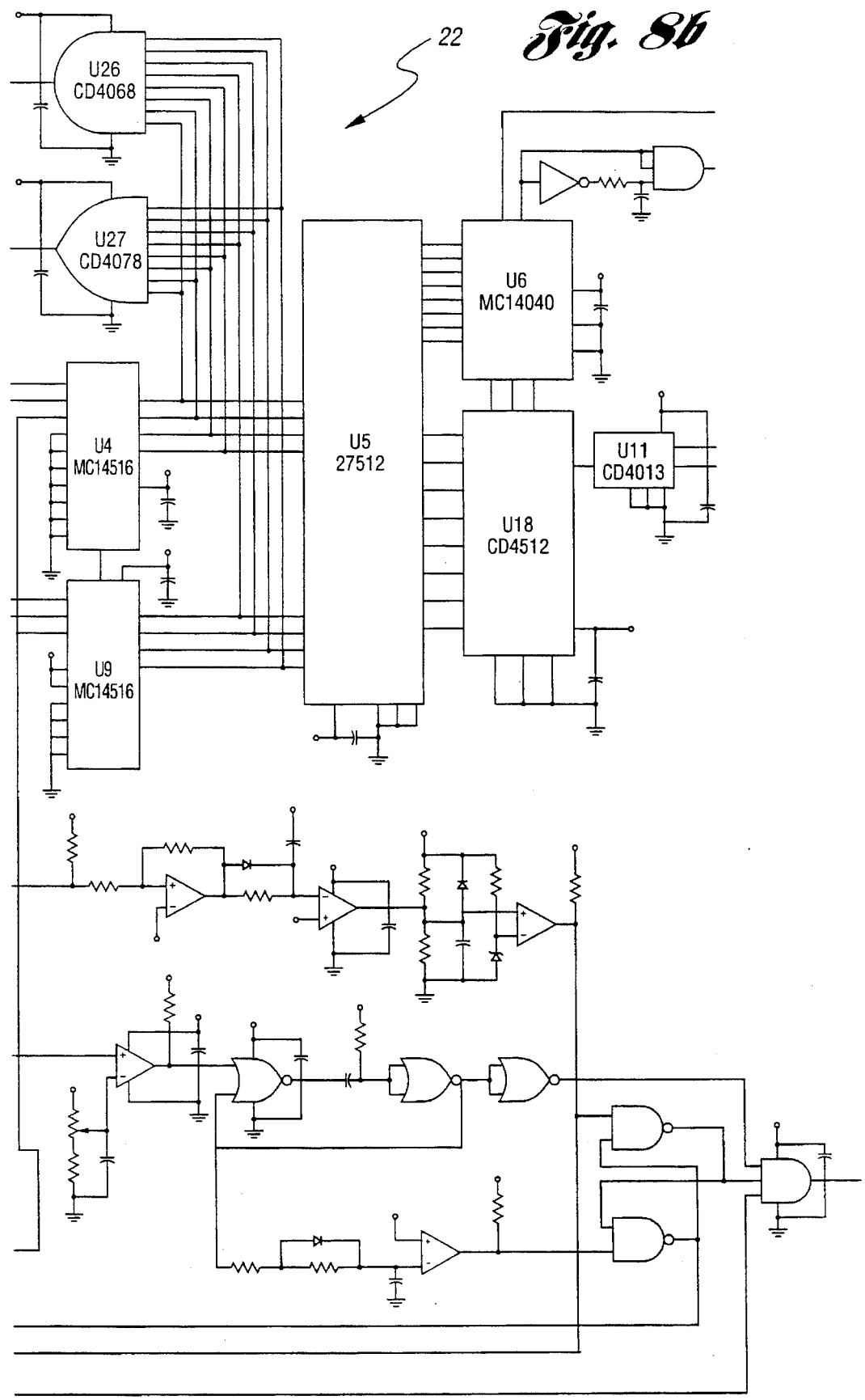
Figure 8C:
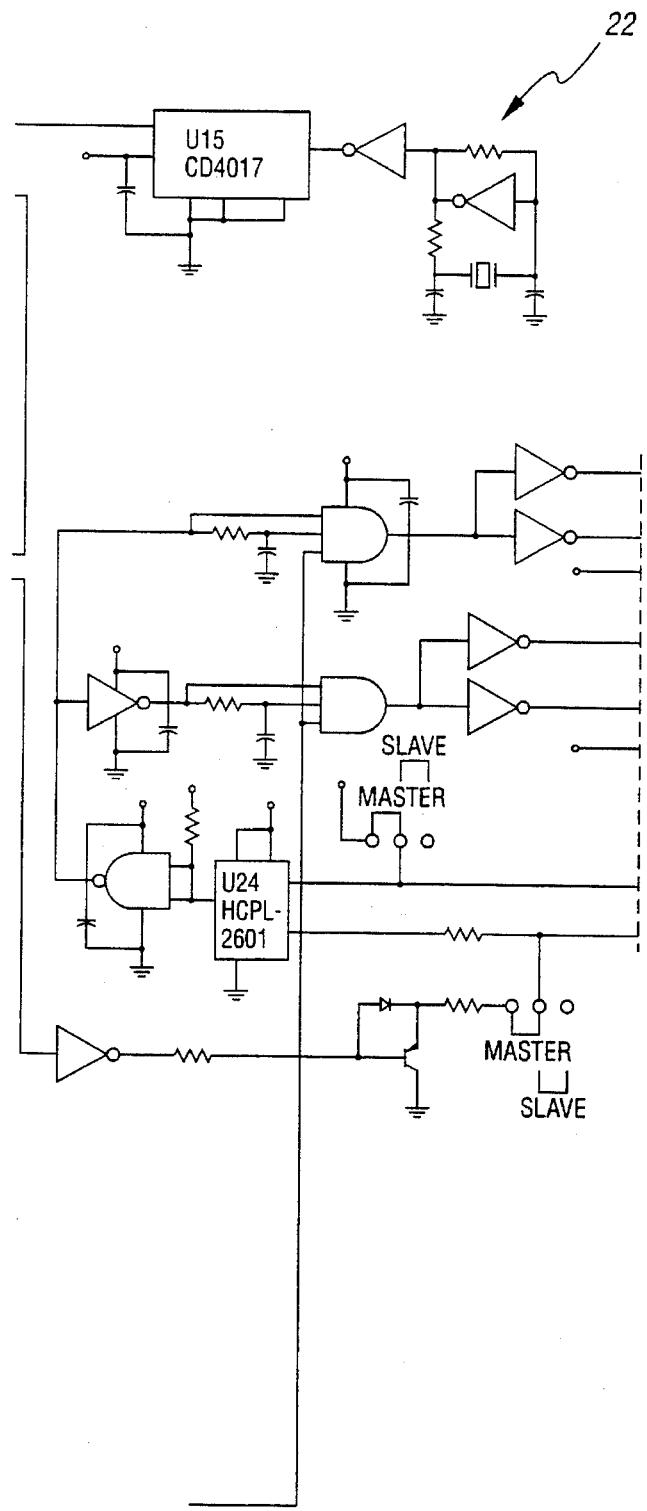

As seen in FIGS. 7a–7b, an Erasable Programmable Read Only Memory (EPROM) (26) stores a plurality of PWM waveforms having different fundamental components. Each PWM waveform requires a block of memory which is addressed through lines A8 through A15, and is divided into 2048 time slots, each digitized as a 0 or 1. Each PWM waveform also has associated therewith a switching pattern stored in EPROM (26), which is accessed through address lines A0 through A7.

Thereafter, EPROM (26), which is configured as standard 8 bit words, is decoded by decoder (27) to allow bits to be serially addressed. The address lines and bit lines are clocked with a crystal oscillator (28) and divider (30) to generate a control signal necessary to produce the PWM waveform selected at the desired output frequency (i.e., according to the associated switching pattern). To prevent switching glitches between time slots, a D-type flip flop (32) is deployed as a buffer.

The control signal output of the flip flop (32) is sent to a master out and an optical isolator (34), which is used to eliminate ground noise between multiple inverter connections. According to the jumper configuration illustrated in FIGS. 7a–7b, optical isolator (34) is driven by the internal master out control signal. However, as is readily apparent, with a different jumper configuration, optical isolator (34) may also be driven by an external master in control signal. This allows any one of multiple controllers (22) to be operated as a master (to generate a control signal) or as a slave (to receive a control signal).

The output control signal of the isolator (34) feeds an inverter (36) and delays (38). The inverter (36) inverts the control signal for driving of the second inverter pole (16) and the delays (38) produce a fixed time delay for turn on of the power semiconductors. This ensures both semiconductors in one inverter pole (16) cannot be activated simultaneously, which would cause a short circuit condition across the DC power source (12) during commutation.

The output control signal is also gated at logical AND operators (40) with various override signals operative to shut down (i.e., isolate) the system (10). Override signals are produced by any one or more of various conditions, including controller deactivation (via an "on/off" switch set to "off"), thermal overload, instantaneous overcurrent, overcurrent latch, or undervoltage.

The controller deactivation and thermal overload override signals are simply on/off commands allowing the inverter to be shut down manually or in the event of thermal overload. As previously noted, thermal protector TB1 (seen in FIG. 1) provides a means for generating a thermal overload signal upon thermal overload of the inverter. In that same regard, gates (42, 44, 40) provide a means for generating an override signal operative to isolate the inverter in response to the thermal overload signal.

The undervoltage override signal serves to protect the inverter poles (16) from insufficient (i.e., low voltage) control signals. It also serves the secondary purpose of resetting a set/reset flip flop (46) during power up of the system (10). The function of the set/reset flip flop (46) will be described in greater detail below in relation to the overcurrent latch override signal.

Still referring to FIGS. 7a–7b, undervoltage detector (48) provides a means for generating a DC input voltage signal representing the DC input voltage, as well as a means for comparing the DC input voltage signal to a reference value. Finally, undervoltage detector (48) and gates (42, 44, 40) together provide a means for generating an override signal operative to isolate the inverter when the DC input voltage signal fails to exceed the reference value.

Overcurrent is detected via a peak current detector (50). The output of peak current detector (50) causes a one shot multivibrator (52) to be triggered which shuts down the inverter poles (16) for a small fraction of the cycle, thereby providing instantaneous overcurrent protection. Simultaneously, the output signals of the one shot multivibrator (52) are integrated by an integrator (54). The output voltage of the integrator (54) ramps according to the quantity of the output signals from the one shot multivibrator (52) and, if the level exceeds that required, the set/reset flip flop (46) is set, thereby providing overcurrent latch protection.

In such a fashion, the overcurrent circuitry protects the inverter poles (16) from instantaneous faults while also preventing the inverter poles (16) from sporadic nuisance tripping. As is readily apparent from the foregoing description regarding the overcurrent circuitry, peak current detector (50), one shot multivibrator (52) and gates (44, 40) together provide a means for comparing the DC input current signal generated by the current transducer (20) to a reference value, a means for generating an override signal operative to temporarily isolate the inverter when the DC input current exceeds the reference value, and means for generating an override signal operative to isolate the inverter when the DC input current exceeds the reference value for greater than a predetermined time period.

Still referring to FIGS. 7a–7b, the remaining portion of the schematic pertains to selecting the desired fundamental component and addressing the EPROM (26). In this portion of the schematic, the system (10) of the present invention undertakes an analog to digital conversion.

Normally, an analog error signal pertaining to the AC output voltage will cause inverter poles (16) to alternate between two fundamental switching patterns, thereby producing an average of the PWM waveform desired. Error signals indicating that the output AC voltage is not correct can be caused by a number of factors, among the most notable being a change in the AC output load or a change in the DC voltage supplied by DC power source (12).

However, in applications where power is feeding compact fluorescent lamps or other loads where small, rapid changes of supply voltage can cause undesirable results, even small steps changes on the order of 0.25% can be bothersome in that they produce small changes in lamp light which are visible to the naked eye. In the analog to digital conversion of the system (10) of the present invention, however, digitizing errors are already insignificant with such small step changes. To produce smaller steps is therefore not practical given that resulting digitizing errors will not be significantly affected.

The system (10) of the present invention solves this problem by allowing step changes only when the analog error signal pertaining to the AC output voltage is outside a fixed tolerance. An error band is set to several percent of the desired AC output voltage. Only if the error signal exceeds the tolerance of the error band is a new switching pattern selected. Perturbations within the error band will not cause the switching pattern to be changed. Operating in this fashion, the resulting small changes in lamp light are undetectable to the naked eye.

The system (10) of the present invention for controlling a DC to AC voltage inverter is implemented, in part, by monitoring the AC output voltage and comparing its root means square (RMS) value to a reference value (59) to obtain the error signal. More specifically, AC output voltage is sensed via an AC output voltage sensor (56) and the RMS value of the AC output voltage is obtained via an RMS inverter (58).

The error signal is fed through an absolute value inverter (60) and a polarity detector (62). Polarity detector (62) is used to set the direction of an up/down counter (64) whose output addresses switching patterns stored in EPROM (26). The output of absolute value detector (60) controls a voltage controlled oscillator (VCO) (66). VCO (66) clocks the up/down counter (64) at a rate proportional to the magnitude of the error signal.

The error band is determined by error band detector (68) which, as seen in FIGS. 7a–7b, is a comparator. Error band detector (68) compares the magnitude of the error signal from the absolute value inverter (60) to the reference value. The clock pulses of the VCO (66) are gated (70) with the output of error band detector (68) to produce clock pulses only when the magnitude of the error signal is outside the tolerance of the error band. To keep the up/down counter from continuously counting, end stops are produced with a minimum/maximum detector (72). The minimum/maximum detector (72) is also gated (70) with the clock pulses to control the up/down counter (64). The gain of this digital control subsystem is determined by the gain of the VCO (66).

As previously mentioned, inverter poles (16) and controller (22) together provide a means for generating one of a plurality of pulse width modulated (PWM) waveforms to convert a DC input voltage to an AC output voltage suitable for use with a non-linear load. Similarly, as is readily apparent from the foregoing description, output voltage sensor (56) and RMS inverter (58) together provide a means for generating an AC output voltage signal representing the AC output voltage.

Moreover, reference value comparator (59), absolute value inverter (60), polarity detector (62), up/down counter (64), VCO (66), error band detector (68), gate (70) and min/max detector (72) together provide a means for processing the AC output voltage signal to select one of the plurality of PWM waveforms. Likewise, crystal oscillator (28), divider (30), EPROM (26), decoder (27), flip flop (32), isolator (34), inverter (36), delays (38) and gates (40) together provide a means for generating a control signal based on the PWM waveform selected operative to control the means for generating one of the plurality of PWM waveforms.

More specifically, in that same regard, EPROM (26) provides a means for storing the plurality of PWM waveforms and a plurality of switching patterns, each PWM waveform having one of the plurality of switching patterns associated therewith. RMS inverter (58), reference value comparator (59), absolute value inverter (60) and error band detector (68) together comprise means for generating an AC output voltage error signal, as well as means for comparing the AC output voltage error signal to a reference band. Similarly, polarity detector (62), up/down counter (64), gate (70) and min/max detector (72) together provide a means for selecting from storage a first PWM waveform when the AC output voltage error signal falls within the reference band, as well as a means for selecting from storage a second PWM waveform when the AC output voltage error signal falls outside the reference band.

Still further, crystal oscillator (28) and divider (30) together provide a means for retrieving from storage the switching pattern associated with the PWM waveform selected. Decoder (27) likewise provides a means for converting the switching pattern retrieved to the control signal, while isolator (34) together provide means for filtering noise from the control signal.

Figure 9:
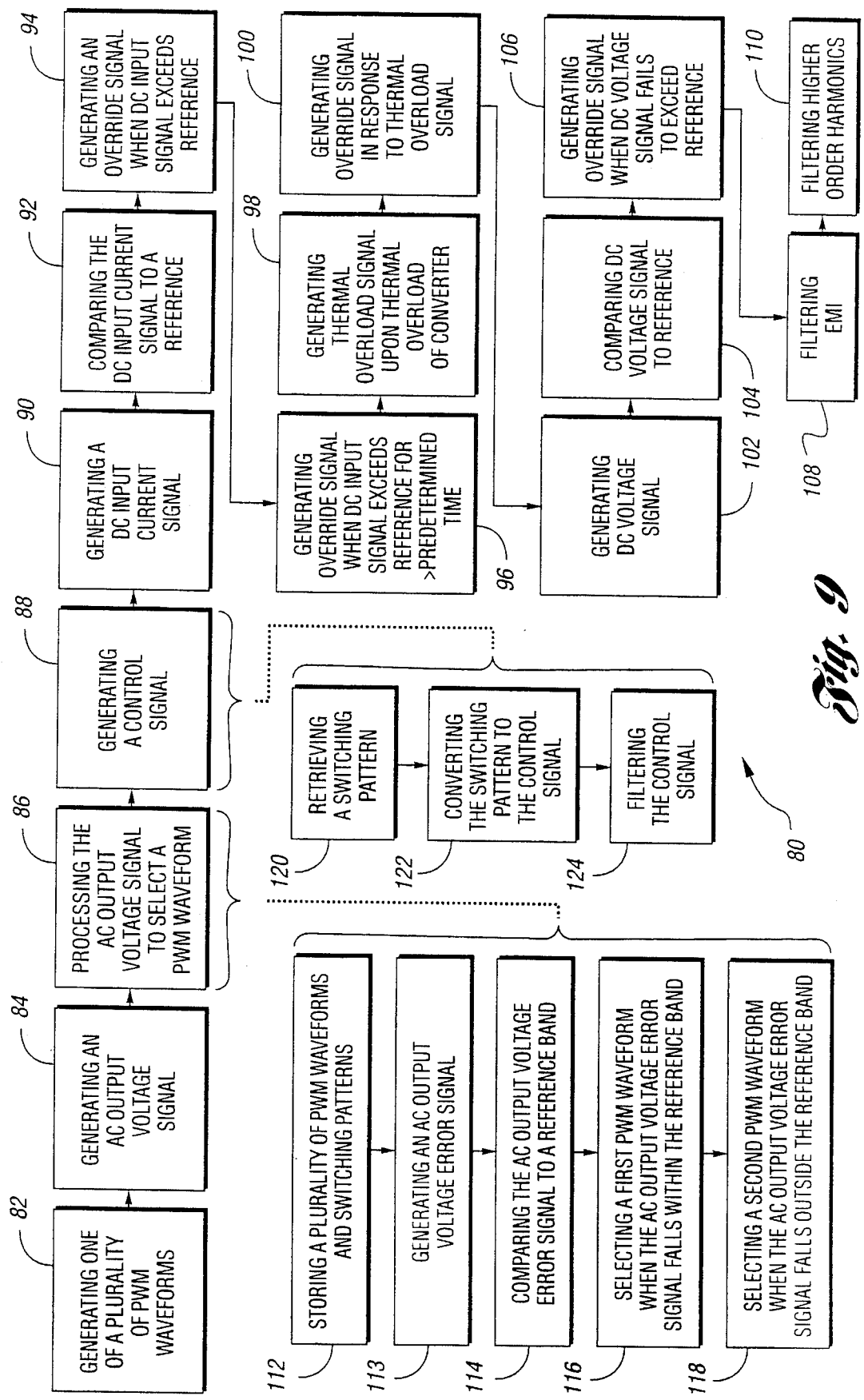
FIG. 9 is a block diagram of the method for controlling a DC to AC voltage inverter of the present invention.

Referring finally to FIG. 9, a block diagram of the method for controlling a DC to AC voltage inverter of the present invention is shown, denoted generally by reference numeral 80. As seen therein, and as described generally above with respect to the system of the present invention, the method (80) of the present invention comprises generating (82) one of a plurality of pulse width modulated (PWM) waveforms to convert a DC input voltage to an AC output voltage suitable for use with a non-linear load, and generating (84) an AC output voltage signal representing the AC output voltage. The method (80) also comprises processing (86) the AC output voltage signal to select one of the plurality of PWM waveforms, and generating (88) a control signal based on the PWM waveform selected operative to control the generation of one of the plurality of PWM waveforms.

The method (80) of the present invention for controlling a DC to AC voltage inverter further comprises generating (90) a DC input current signal representing a DC input current associated with the DC input voltage, and comparing (92) the DC input current signal to a reference value. The method (80) still further comprises generating (94) an override signal operative to temporarily isolate the inverter when the DC input current signal exceeds the reference value, and generating (96) an override signal operative to isolate the inverter when the DC input current signal exceeds the reference value for greater than a predetermined time period.

The method (80) of the present invention for controlling a DC to AC voltage inverter further comprises generating (98) a thermal overload signal upon thermal overload of the inverter, and generating (100) an override signal operative to isolate the inverter in response to the thermal overload signal. The method (80) still further comprises generating (102) a DC input voltage signal representing the DC input voltage, comparing (104) the DC input voltage signal to a reference value, and generating (106) an override signal operative to isolate the inverter when the DC input voltage signal fails to exceed the reference value. The method (80) still further comprises filtering (108) electromagnetic interference from the DC input voltage, and filtering (110) higher order harmonics from the PWM waveform generated.

Still referring to FIG. 9, processing (86) the AC output voltage signal to select one of the plurality of PWM waveforms itself comprises storing (112) the plurality of PWM waveforms and a plurality of switching patterns in a memory, each PWM waveform having one of the plurality of switching patterns associated therewith, generating (113) an AC output voltage error signal, and comparing (114) the AC output voltage error signal to a reference band. Processing (86) the AC output voltage signal to select one of the plurality of PWM waveforms itself further comprises selecting (116) from the memory a first PWM waveform when the AC output voltage error signal falls within the reference band, and selecting (118) from the memory a second PWM waveform when the AC output voltage error signal falls outside the reference band.

Finally, generating (88) a control signal based on the PWM waveform selected operative to control generation one of the plurality of PWM waveforms itself comprises retrieving (120) from the memory the switching pattern associated with the PWM waveform selected, and converting (122) the switching pattern retrieved to the control signal. Generating (88) a control signal based on the PWM waveform selected operative to control generation one of the plurality of PWM waveforms further comprises filtering (124) noise from the control signal.

As is readily apparent from the foregoing description and drawings, the present invention provides an improved system (10) and method (80) for controlling a DC input voltage to an AC output voltage inverter. As is also apparent, the present invention also provides a system (10) and method (80) for controlling a DC input voltage to an AC output voltage inverter that such produces an AC output voltage suitable for use with non-linear electrical loads such as computers, solid-state lighting ballasts, and compact fluorescent lamps.

The system (10) and method (80) of the present invention for controlling conversion from a DC input voltage to an AC output voltage have been described and shown herein in conjunction with a 120 volt sinusoidal AC output. However, it should be readily apparent that the system (10) and method (80) of the present invention are suitable for use in any application where any type of AC output voltage may be required, including different AC voltages and waveforms.

It is to be understood that the present invention has been described in an illustrative manner and the terminology which has been used is intended to be in the nature of words of description rather than of limitation. Obviously, many modifications and variations of the present invention are possible in light of the above teachings. Therefore, it is also to be understood that, within the scope of the following claims, the invention may be practiced otherwise than as specifically described.

We claim:

1. A system for controlling a DC to AC voltage inverter, the system comprising:
   means for generating one of a plurality of pulse width modulated (PWM) waveforms to convert a DC input voltage to an AC output voltage suitable for use with a non-linear load;
   means for generating an AC output voltage signal representing the AC output voltage;
   means for processing the AC output voltage signal to select one of the plurality of PWM waveforms, the means for processing including
      means for storing the plurality of PWM waveforms and a plurality of switching patterns, each PWM waveform having one of the plurality of switching patterns associated therewith;
      means for generating an AC output voltage error signal;
      means for comparing the AC output voltage error signal to a reference band;
      means for selecting from storage a first PWM waveform when the AC output voltage error signal falls within the reference band; and
      means for selecting from storage a second PWM waveform when the AC output voltage error signal falls outside the reference band; and
   means for generating a control signal based on the PWM waveform selected operative to control the means for generating one of a plurality of PWM waveforms.

2. The system of claim 1 further comprising:
   means for generating a DC input current signal representing a DC input current associated with the DC input voltage;
   means for comparing the DC input current signal to a reference value; and
   means for generating a first override signal operative to temporarily isolate the inverter when the DC input current signal exceeds the reference value.

3. The system of claim 2 further comprising means for generating a second override signal operative to isolate the inverter when the DC input current signal exceeds the reference value for greater than a pre-determined time period.

4. The system of claim 1 further comprising:
   means for generating a thermal overload signal upon thermal overload of the inverter; and
   means for generating an override signal operative to isolate the inverter in response to the thermal overload signal.

5. The system of claim 1 further comprising:
   means for generating a DC input voltage signal representing the DC input voltage;
   means for comparing the DC input voltage signal to a reference value; and
   means for generating an override signal operative to isolate the inverter when the DC input voltage signal fails to exceed the reference value.

6. The system of claim 1 further comprising means for filtering electromagnetic interference from the DC input voltage.

7. The system of claim 1 further comprising means for filtering higher order harmonics from the PWM waveform generated by the means for generating one of a plurality of PWM waveforms, the filtering means having sufficient impedance such that the PWM waveform generated is suitable for use with a load having a negative resistance characteristic.

8. The system of claim 1 wherein the means for generating one of a plurality of PWM waveforms comprises at least one pair of inverter poles.

9. The system of claim 1 wherein the means for generating a control signal based on the PWM waveform selected operative to control the means for generating one of the plurality of PWM waveforms comprises:
   means for retrieving from storage the switching pattern associated with the PWM waveform selected;
   means for converting the switching pattern retrieved to the control signal; and
   means for filtering noise from the control signal.

10. A system for controlling a DC to AC voltage inverter, the system comprising:
    an inverter for generating one of a plurality of pulse width modulated (PWM) waveforms to convert a DC input voltage to an AC output voltage suitable for use with a non-linear load;
    a signal generator for generating an AC output voltage signal representing the AC output voltage;
    a processor for processing the AC output voltage signal to select one of the plurality of PWM waveforms, the processor including
       a memory for storing the plurality of PWM waveforms and a plurality of switching patterns, each PWM waveform having one of the plurality of switching patterns associated therewith;
       an error signal generator for generating an AC output voltage error signal;
       an comparator for comparing the AC output voltage error signal to a reference band;
       means for selecting from storage a first PWM waveform when the AC output voltage error signal falls within the reference band; and
       means for selecting from storage a second PWM waveform when the AC output voltage error signal falls outside the reference band; and a control signal generator for generating a control signal based on the PWM waveform selected operative to control the inverter for generating one of a plurality of PWM waveforms.

11. A method for controlling a DC to AC voltage inverter, the method comprising:

generating one of a plurality of pulse width modulated (PWM) waveforms to convert a DC input voltage to an AC output voltage suitable for use with a non-linear load;

generating an AC output voltage signal representing the AC output voltage;

processing the AC output voltage signal to select one of the plurality of PWM waveforms, the processing including storing the plurality of PWM waveforms and a plurality of switching patterns in a memory, each PWM waveform having one of the plurality of switching patterns associated therewith;

generating an AC output voltage error signal;

comparing the AC output voltage error signal to a reference band;

selecting from the memory a first PWM waveform when the AC output voltage error signal falls within the reference band.;

selecting from the memory a second PWM waveform when the AC output voltage error signal falls outside the reference band; and generating a control signal based on the PWM waveform selected operative to control the generation of one of the plurality of PWM waveforms.

12. The method of claim 11 further comprising:

generating a DC input current signal representing a DC input current associated with the DC input voltage;

comparing the DC input current signal to a reference value; and generating a first override signal operative to temporarily isolate the inverter when the DC input current signal exceeds the reference value.

13. The method of claim 12 further comprising generating a second override signal operative to isolate the inverter when the DC input current signal exceeds the reference value for greater than a predetermined time period.

14. The method of claim 11 further comprising:

generating a thermal overload signal upon thermal overload of the inverter; and generating an override signal operative to isolate the inverter in response to the thermal overload signal.

15. The method of claim 11 further comprising:

generating a DC input voltage signal representing the DC input voltage;

comparing the DC input voltage signal to a reference value; and generating an override signal operative to isolate the inverter when the DC input voltage signal fails to exceed the reference value.

16. The method of claim 11 further comprising filtering electromagnetic interference from the DC input voltage.

17. The method of claim 11 further comprising filtering higher order harmonics from the PWM waveform generated, the filtering including providing sufficient impedance such that the PWM waveform generated is suitable for use with a load having a negative resistance characteristic.

18. The method of claim 11 wherein generating a control signal based on the PWM waveform selected operative to control the generation of one of the plurality of PWM waveforms comprises:

retrieving the switching pattern from memory associated with the PWM waveform selected;

converting the switching pattern retrieved to the control signal; and filtering noise from the control signal.

* * * * *

UNITED STATES PATENT AND TRADEMARK OFFICE
CERTIFICATE OF CORRECTION

PATENT NO. : 5,550,697
DATED : August 27, 1996
INVENTOR(S) : John D. Green, et al.

It is certified that error appears in the above-indentified patent and that said Letters Patent is hereby corrected as shown below:

Abstract, line 6, after "generating" replace "a" with --an--;

Column 3, line 57, after "generally" replace "be" with --by--;

Column 6, line 55, after "and" replace "8a-8b" with --8a-8c--;

Column 12, line 60, before "comparator" replace "an" with --a--;

Signed and Sealed this

Twenty-eighth Day of October, 1997

Attest:

BRUCE LEHMAN

Attesting Officer     Commissioner of Patents and Trademarks